United States Patent [19]

Nestegard et al.

[11] Patent Number: 5,393,787
[45] Date of Patent: Feb. 28, 1995

[54] BLOCK COPOLYMER HAVING MIXED MOLECULAR WEIGHT ENDBLOCKS

[75] Inventors: Mark K. Nestegard, Woodbury; Jingjing Ma, Maplewood, both of Minn.

[73] Assignee: Minnesota Mining and Manufacturing Company, St. Paul, Minn.

[21] Appl. No.: 180,903

[22] Filed: Jan. 12, 1994

Related U.S. Application Data

[62] Division of Ser. No. 10,122, Jan. 28, 1993, Pat. No. 5,296,547.

[51] Int. Cl.$^6$ ............... C09J 153/02; B32B 23/08; B32B 27/36; C08F 297/04
[52] U.S. Cl. ............... 524/575; 428/345; 428/355; 428/500; 428/511; 525/314
[58] Field of Search ............ 524/575; 428/345, 355, 428/500, 511

[56] References Cited

U.S. PATENT DOCUMENTS

| | | | |
|---|---|---|---|
| 3,239,478 | 3/1966 | Harlan | 260/27 |
| 3,280,084 | 10/1966 | Zelinski et al. | 260/83.7 |
| 3,519,585 | 7/1970 | Miller | 260/27 |
| 3,639,517 | 2/1972 | Kitchen et al. | 260/879 |
| 3,939,112 | 2/1976 | Needham | |
| 3,985,830 | 10/1976 | Fetters et al. | 260/880 B |
| 4,086,298 | 4/1978 | Fahrbach et al. | 260/880 B |
| 4,091,053 | 5/1978 | Kitchen | |
| 4,092,375 | 5/1978 | Vreugdenhil | 260/876 B |
| 4,133,731 | 1/1979 | Hansen et al. | 204/159.17 |
| 4,148,771 | 4/1979 | Nash | 260/27 BB |
| 4,221,884 | 9/1980 | Bi et al. | 525/314 |
| 4,391,949 | 7/1983 | St. Clair | 525/99 |
| 4,444,953 | 4/1984 | St. Clair | 525/98 |
| 4,556,464 | 12/1985 | St. Clair | 204/159.15 |
| 4,699,938 | 10/1987 | Minamizaki et al. | 524/271 |
| 4,704,434 | 11/1987 | Kitchen et al. | 525/250 |
| 4,704,435 | 11/1987 | Kitchen | 525/250 |
| 4,780,367 | 10/1988 | Lau et al. | 428/355 |
| 4,855,170 | 8/1989 | Darvell et al. | |
| 4,861,635 | 8/1989 | Carpenter et al. | |
| 5,037,411 | 8/1991 | Malcolm et al. | |
| 5,079,090 | 1/1992 | Joseph et al. | |
| 5,104,921 | 4/1992 | Erickson et al. | 524/274 |
| 5,270,396 | 12/1993 | Farrar et al. | |

FOREIGN PATENT DOCUMENTS

| | | |
|---|---|---|
| 0197774 | 10/1986 | European Pat. Off. |
| 52-129795 | 4/1976 | Japan |
| 4-246488 | 1/1991 | Japan |

Primary Examiner—Vasu S. Jagannathan
Attorney, Agent, or Firm—Gary L. Griswold; Walter N. Kirn; James V. Lilly

[57] ABSTRACT

The present invention is directed to a novel polymodal asymmetric elastomeric block copolymer and a pressure sensitive adhesive and tape made therefrom. The novel block copolymer comprises from about 4 to about 40 percent by weight of a polymerized monovinyl aromatic compound and from about 96 to about 60 percent by weight of a conjugated diene. The block copolymer has the general formula $Q_nY$ where Q represents an individual arm of the block copolymer and has the formula S-B; n represents the number of arms and is at least 3; and Y is the residue of a multifunctional coupling agent. Furthermore, S is a nonelastomeric polymer segment endblock of a polymerized monovinyl aromatic homopolymer, there being at least two different molecular weight endblocks in the block copolymer. The number average molecular weight of the higher molecular weight endblock $(Mn)_H$ is in the range of from about 5,000 to about 50,000, and the number average molecular weight of the lower molecular weight endblock $(Mn)_L$ is in the range of from about 2,000 to about 10,000. The ratio $(Mn)_H/(Mn)_L$ is at least 1.25. In addition, B is an elastomeric polymer segment midblock which connects each arm to a residue of a multifunctional coupling agent (Y) and comprises a polymerized conjugated diene or combination of conjugated dienes.

25 Claims, No Drawings

BLOCK COPOLYMER HAVING MIXED MOLECULAR WEIGHT ENDBLOCKS

This is a division of Application Ser. No. 08/010,122, filed Jan. 28, 1993, now U.S. Pat. No. 5,296,547.

FIELD OF THE INVENTION

The present invention relates to a polymodal asymmetric elastomeric block copolymer having mixed molecular weight endblocks and to a pressure sensitive adhesive and tape made therefrom.

BACKGROUND OF THE INVENTION

Block copolymers are known in the art for a variety of applications including the fabrication of impact resistant packaging materials, fabrication of molded articles and formulation of adhesives. Patent and scientific literature discloses numerous molecular variations of block copolymers which are suitable for such applications. See, for example, U.S. Pat. No. 3,639,517 (Kitchen); U.S. Pat. No. 4,221,884 (Bi) and Japanese Patent 52[11977]-129795. References which disclose the use of block copolymers to formulate adhesives include, for example, U.S. Pat. No. 4,780,367 (Lau), U.S. Pat. No. 4,444,953 (St. Clair); U.S. Pat. No. 4,556,464 (St. Clair); U.S. Pat. No. 3,239,478 (Harlan) and U.S. Pat. No. 3,932,328 (Korpman).

Not all block copolymers, however, are suitable for every adhesive application. For example, conventional star block copolymers are generally not suitable for use in removable tape applications wherein the tape is typically removed when it is no longer needed. Such applications require an adhesive that possesses a fourfold balance of tack, cohesive strength, adhesion and resistance to low stress peel. Especially important is the balance between the properties of adhesion and resistance to low stress peel.

When conventional monovinyl aromatic/conjugated diene star block copolymers (such as styrene-isoprene-styrene (SIS) star block copolymers) are used to formulate a tape having adhesion in the range desirable for removable tapes, the tape lacks sufficient resistance to low stress peel. When formulated to have sufficient resistance to low stress peel, the adhesion of the tape is often too high and the tape is difficult to remove. Often the peel and unwind are not smooth as well.

It is the object of the present invention to provide a novel block copolymer which can be formulated into a pressure sensitive adhesive. The pressure sensitive adhesive may be used to make a variety of different types of tapes including removeable tapes. Specific examples of the various tapes which may be made include masking tapes, packaging tapes, medical tapes and autoclave indicator tapes. Additionally, the pressure sensitive adhesive may be used to make protective sheeting, labels, and facestock.

SUMMARY OF THE INVENTION

The present invention is directed to a novel polymodal asymmetric elastomeric block copolymer having at least three arms. The novel block copolymer may have a radial structure with three to five arms; or may have a star structure with six or more arms. In addition, the block copolymer may be referred to as branched.

The term "polymodal" means that the copolymer comprises endblocks having at least two different molecular weights. The block copolymer is further characterized as having at least one "high" and one "low" molecular weight endblock. The term "asymmetric" means that the arms of the block copolymer are not all identical since the molecular weights of the endblocks are not all the same. The block copolymer may also be referred to as having endblocks with mixed molecular weights.

The block copolymer comprises from about 4 to about 40 percent by weight of a polymerized monovinyl aromatic compound and from about 96 to about 60 percent by weight of a conjugated diene. The block copolymer has the general formula $Q_nY$ where Q represents an arm of the block copolymer and has the formula S-B; n represents the number of arms (Q) and is at least 3; and Y is the residue of a multifunctional coupling agent.

Furthermore, S is a nonelastomeric polymer segment endblock of a polymerized monovinyl aromatic homopolymer, there being at least two different molecular weight endblocks in the block copolymer. The number average molecular weight of the higher molecular weight endblock $(Mn)_H$ is in the range of from about 5,000 to about 50,000, and the number average molecular weight of the lower molecular weight endblock $(Mn)_L$ is in the range of from about 1,000 to about 10,000. The ratio of molecular weights, $(Mn)_H/(Mn)_L$, is at least 1.25.

In addition, B is an elastomeric polymer segment midblock which connects each arm to the residue of a multifunctional coupling agent (Y) and comprises a polymerized conjugated diene or combination of conjugated dienes.

The present invention is also directed to a pressure sensitive adhesive (PSA) made from the block copolymer herein described and a tape which employs the PSA.

The tape of the invention comprises a backing having first and second surfaces and pressure sensitive adhesive coated on at least a portion of the first major surface. The backing may comprise paper or polymer. The adhesive may also be coated onto a backing having a release surface so that the adhesive may be utilized as a transfer tape.

DETAILED DESCRIPTION OF THE INVENTION

The polymodal asymmetric elastomeric block copolymer of the present invention may be prepared by conventional block copolymer anionic polymerization technology. Typically, the first step of this process involves contacting a monovinyl aromatic compound with an initiator in the presence of an inert diluent to form a living polymer having the simplified structure S-M, where M represents a Group I metal such as Na, K and Li. Sequential charges of monovinyl aromatic compound and initiator are made to the reaction vessel to achieve polymer endblocks having a multiplicity of molecular weights (for example, $S_1$-M, $S_2$-M, and $S_3$-M, where $S_1$, $S_2$ and $S_3$ are individual polymer endblocks each having a particular molecular weight). The ratio of monovinyl aromatic to initiator in the first charge determines the molecular weight of the polymer formed from that charge. The molecular weight of polymer formed from a subsequent charge is determined by the amount of initiator and monovinyl aromatic used in the subsequent charge, as well as the amount of living polymer resulting from previous charges.

Organomonolithium compounds are useful initiators in the first step of the process described above. These compounds are represented by the structure RLi where R is an aliphatic, cycloaliphatic, or aromatic radical. Examples include ethyl lithium, n-propyl lithium, isopropyl lithium, n-butyl lithium, sec-butyl lithium, tertoctyl lithium, n-decyl lithium, phenyl lithium, 2-napthyl lithium, 4-butylphenyl lithium, 4-phenylbutyl lithium, cyclohexyl lithium, and the like. The inert diluent may be aromatic, naphthenic or parathenic hydrocarbon. Specific examples of useful inert diluents include n-pentane, n-hexane, isooctane, cyclohexane, toluene, benzene, xylene and the like.

The living polymer from step one is contacted with a conjugated diene (B) to form living polymer having the general structure S-B-M. The living polymer is then coupled with a multifunctional coupling agent to form a linked block copolymer. Since this coupling reaction may not always go to completion, there may also be some unlinked diblock (S-B) present in the polymer mass. The amount of unlinked diblock will vary with the coupling efficiency of the linking reaction.

The multifunctional coupling agents suitable for the invention may be any of the polyalkenyl coupling agents or other materials known to have functional groups which can react with carbanions of the living polymer to form linked polymers. Examples of suitable multifunctional coupling agents include silicon halides, polyepoxides, polyisocyanates, polyketones, polyanhydrides, dicarboxylic acid esters. Suitable polyalkenyl coupling agents may be aliphatic, aromatic or heterocyclic. Examples of aliphatic polyalkenyl coupling agents include the polyvinyl and polyalkyl acetylenes, diacetylenes, phosphates and phosphites, dimethacrylates such as ethylene dimethacrylate, and the like. Examples of suitable heterocyclic polyalkenyl coupling agents include divinyl pyridine, divinyl thiophene, and the like. Examples of suitable aromatic alkenyl coupling agents, which are preferred in the present invention, include polyvinyl benzene, polyvinyl toluene, polyvinyl xylene, polyvinyl anthracene, polyvinyl naphthalene, divinyl durene and the like. Suitable polyvinyl groups include divinyl, trivinyl and tetravinyl. Divinylbenzene (DVB) is the preferred coupling agent in the present invention, and may include o-divinylbenzene, m-divinylbenzene, p-divinylbenzene, and mixtures of the same.

More than two endblock molecular weights may be present in a block copolymer molecule, and the number of molecular weights may be altered to tailor the block copolymer for use in specific applications. Preferably, the molecular weight distribution of the endblock polymer is bimodal, that is, comprises two different molecular weight ranges, a high range and a low range. The number average molecular weight of the lower molecular weight endblock is in the range from about 1,000 to about 10,000, preferably from about 2,000 to about 9,000, more preferably between 4,000 and 7,000. The number average molecular weight of the higher molecular weight endblock is in the range from about 5,000 to about 50,000, preferably from about 10,000 to about 35,000.

The ratio of arms having high molecular weight endblocks to arms having low molecular weight endblocks has an effect on a number of properties, including the tensile strength of the polymer. When the block copolymer has only two different molecular weight endblock distributions, the number of arms containing higher molecular weight endblocks is preferably between about 5 and 70 percent of the total number of arms in the block copolymer, more preferably between about 10 and 45 percent, and most preferably between about 15 and 35 percent.

The midblocks may contain small amounts of a monovinyl aromatic material, but in the preferred case, are predominantly polymerized conjugated diene or mixtures of conjugated dienes. The block copolymer typically comprises from about 4 to 40 percent by weight of a polymerized monovinyl aromatic homopolymer, and from about 96 to 60 percent by weight of a polymerized conjugated diene or polymerized combination of dienes. Preferably the block copolymer comprises from about 5 to 25 percent of a polymerized monovinyl aromatic and from about 95 to 75 percent of a polymerized conjugated diene, and more preferably from about 6 to 15 percent of a polymerized monovinyl aromatic and from about 94 to 85 percent of a polymerized conjugated diene. The nonelastomeric endblock polymer segments and the elastomeric midblock polymer segments are generally present as at least two distinct phases. The endblocks from the lowest molecular weight distribution may be present as a third phase depending on the difference in endblock molecular weights.

The monomers which comprise the polymerized monovinyl aromatic endblocks typically contain from 8 to 18 carbon atoms, and examples of useful monovinyl aromatic monomers include styrene, alpha-methylstyrene, vinyltoluene, vinylpyridine, ethylstyrene, t-butylstyrene, isopropylstyrene, dimethylstyrene, other alkylated styrenes, and the like. Presently the preferred endblocks are polystyrene. The monomers which comprise the polymerized conjugated diene midblocks typically contain from 4 to 12 carbon atoms, and examples of useful conjugated diene monomers include butadiene, isoprene, ethylbutadiene, phenylbutadiene, piperylene, dimethylbutadiene, hexadiene, ethylhexadiene, and the like. The polymerized conjugated dienes may be employed individually or as mixtures or copolymers with one another. Polybutadiene and polyisoprene are presently preferred as the midblocks, and of the two, polyisoprene is particularly preferred.

A preferred use of the polymer of the present invention is the formulation of adhesive compositions. Various formulating ingredients are known for the preparation of adhesives from block copolymers. The formulating ingredients may include tackifying resins and plasticizers, which perform a variety of functions in the formulation of adhesives. The block copolymer itself may not be sufficiently tacky to function as an adhesive. In this case, it may be necessary to add a tackifying resin or combination of resins to increase the tack. At least one tackifying resin must be compatible with the elastomeric midblock of the block copolymer, but it may also be compatible with at least one of the endblock polymer segments. In the present invention, solid or hard tackifying resins that are compatible with the midblock are generally preferred.

Tackifiers or tackifying resins generally refer to materials which are miscible with the elastomeric block in the block copolymer, have a number average molecular weight $M_n$ of 10,000 grams per mol (g/mol) or less, a softening point above 70° C. as determined using a ring and ball apparatus, and a glass transition temperature ($T_g$) of −30° C. or more as measured by differential scanning calorimetry (DSC). Suitable tackifying resins may include rosin and rosin derivatives, polyterpenes, coumarone indenes, hydrogenated resins and hydrocarbon resins, for example: alpha pinene-based resins, beta pinene-based resins, limonene-based resins, piperylene-based hydrocarbon resins, esters of rosins, polyterpene and aromatic modified polyterpene resins, aromatic modified piperylene-based hydrocarbon resins, aromatic modified dicyclopentadiene-based hydrocarbon resins and aromatic modified co-terpene and ter-terpene resins. Preferably a tackifying resin is present in the pressure sensitive adhesive of the present invention in an amount of from about 20 to about 400 parts by weight per 100 parts by weight of the block copolymer.

Plasticizers may also be used in the adhesive formulation to provide wetting action and/or viscosity control. These plasticizers are well known in the art and may include hydrocarbon oils, liquid or soft tackifiers, including liquid hydrocarbon resins, liquid polyterpenes, liquid rosin esters, liquid polystyrene resins and the like, elastomer oligomers, waxes, and mixtures of oils and hard tackifiers. A plasticizer may be present in the pressure sensitive adhesive of the present invention in an amount of from 0 to about 200 parts by weight per 100 parts by weight of the block copolymer.

The adhesive of the present invention may also be crosslinked. In general, crosslinking improves the solvent resistance and high temperature cohesive strength of the adhesive. Various crosslinking agents such as crosslinking promoters and reactive curatives may be employed to facilitate crosslinking of the adhesive. These agents are known to those of skill in the art and may be used in combination with heat, ultraviolet radiation or electron beam radiation to effectuate crosslinking. A crosslinking agent may be present in the pressure sensitive adhesive of the present invention in an amount of from 0 to about 50 parts by weight per 100 parts of copolymer elastomer.

Generally, it has been found that the greater the molecular weight of the block copolymer, the lower the irradiation dosage or the lower the amount of crosslinking agent required to attain satisfactory crosslinking. Satisfactory crosslinking is generally believed to be attained when the composition possesses at least about 60% polymer gel content.

Furthermore, it is preferable to employ block copolymer coupled to an efficiency of at least 80% when formulating adhesives that are to be crosslinked.

The adhesive of the present invention may also be modified with supplementary materials including pigments, fillers, stabilizers, antioxidants, and the like.

The adhesive composition of the present invention may be applied to a substrate from a solution of up to about 60% by weight solids of the ingredients in a solvent such as toluene, the solvent being removed by evaporation prior to crosslinking by exposure to the radiation. Alternatively, the ingredients may be emulsified and the adhesive applied to a substrate as 50-60% by weight solids water-based emulsions, the water being removed by evaporation prior to crosslinking. Adhesives of the present invention may also be applied to a substrate as a 100% solids hot melt.

A preferred use of the pressure sensitive adhesive of the invention is in the preparation of pressure sensitive adhesive tapes. The tape of the invention comprises a backing having first and second surfaces and a pressure sensitive adhesive coated on at least a portion of the first major surface. The backing sheet may be a plastic film, paper or any other suitable material, and the tape may include various other layers or coatings, such as primers, release coatings and the like, which are generally known and used in the manufacture of pressure sensitive adhesive tapes. The tape may be coated onto both sides of the backing to form a double sided tape, or the adhesive may be coated onto a backing having a release surface so that the adhesive film may be utilized as a transfer tape.

The present invention is illustrated by the examples herein, but the particular materials and amounts thereof recited in these examples, as well as other conditions and details, should not be construed to unduly limit this invention.

EXAMPLE 1

Three bimodal asymmetric elastomeric block copolymers (A, B and C) of this invention were prepared along with two symmetric block copolymer standards (D, E) each having endblocks with only one molecular weight. See Table 1. Polymerization reactions were conducted in single neck round bottom flasks equipped with Rotoflo ™ stopcocks and magnetic stirring bars. All transfers of solvents, monomers and coupling agents into the flasks were conducted through the stopcock either under high vacuum conditions or under argon atmosphere.

A first reactor vessel was charged with dry Analytical Reagent (AR) grade cyclohexane (available from Mallinckrodt Chemicals Co., Paris, Ky.), 12 wt % sec-butyllithium in cyclohexane (available from Lithium Corporation of America, Bemmemer City, N.C.), and 99% pure styrene (available from Aldrich Chemical Company, Milwaukee, Wis.) under argon protection. The reactor was placed in a water bath at 40° C. with stirring for one hour. For the three asymmetric block copolymers, additional sec-butyllithium was then added into the reactor followed by the addition of the remaining styrene to achieve the target bimodal distribution of endblock molecular weights. Polymerization of the living polystyrene endblock mixture was continued at 50° C. for at least one hour after the second monomer charge. All quantities of the above-mentioned chemicals are given in Table I. A second reactor was charged with purified cyclohexane and 99% pure isoprene (available from Goodyear Tire & Rubber Co., Akron Ohio). The living styrene polymer solution from the first reactor was transferred through a cannula, under, argon atmosphere, into the second reactor vessel. The contents were allowed to polymerize for a minimum of three hours at 55° C. to complete formation of a styrene-isoprene [S-I] diblock copolymer. Dry divinylbenzene (DVB) (available from Dow Chemical Company, Midland, Mich.) was then added to the vessel in an amount several times that of the initiator, as indicated in Table 1, and allowed to react for about 12 hours at 50°-60° C. to link the living diblock arms into a branched structure. A few drops of AR grade isopropyl alcohol (available from Mallinckrodt Chemicals Co., Paris, Ky.), previously purged with argon, were introduced into the reactor vessel to terminate the reaction, followed by 1-2% (based on polymer weight) of octadecyl-3,5,-di-tert-butyl-4-hydroxyhydrocinnamate (Irganox ™ 1076) antioxidant (available from Ciba-Geigy Corp., Hawthorne, N.Y.) added to stabilize the linked block copolymer. To recover, the linked block copolymer, along with any remaining unlinked diblock, was precipitated into AR grade isopropanol and dried in a vacuum oven at 50° C. for three days.

TABLE 1

| Polymer | 1st charge | | | 2nd Charge | | | cyclo-hexane (ml) | DVB (mmole) |
|---|---|---|---|---|---|---|---|---|
| | cyclo-hexane (ml) | sec-BuLi (mmole) | styrene (g) | sec-BuLi (mmole) | styrene (g) | isoprene (g) | | |
| A | 200 | 0.24 | 4.1 | 0.96 | 3.6 | 120 | 1300 | 12 |
| B | 150 | 0.43 | 3.9 | 0.7 | 3.7 | 113 | 1400 | 11.3 |
| C | 150 | 0.6 | 7.2 | 0.4 | 2.0 | 100 | 1400 | 10 |
| D | 150 | 1.0 | 3.0 | — | — | 100 | 1500 | 10 |
| E | 150 | 1.0 | 11.0 | — | — | 100 | 1400 | 10 |

The number average molecular weights ($M_n$) of the polystyrene endblocks, arms and star block copolymers were determined by size exclusion chromatography (SEC). The endblocks, arms and star block copolymers were characterized using a Hewlett-Packard Model 1082B size exclusion chromatograph equipped with two bimodal Zorbax PSM Kits (two columns at 60-S Å and two columns at 1000-S Å). Individual endblock, arm and star block copolymer samples were dissolved in filtered, AR grade tetrahydrofuran (available from Mallinckrodt Chemical Co., Paris, Ky.) and passed through columns at a rate of 0.5 mL per minute at 40° C. The refractive indices of the endblocks, arms and star block copolymers were measured using a Hewlett-Packard Model 1037A differential refractometer detector and compared against the calibration curves obtained using polystyrene standards. All molecular weight averages are polystyrene equivalent molecular weights and are summarized in Table 2. The percent of arms having high molecular weight endblocks, indicated as "% high M.Wt. arms" in Table 2, was estimated from the design parameters of the experiment and was determined from a ratio of the first and second charges of initiator. The total weight percent polystyrene was determined from the monomer charge ratio of styrene and isoprene in each polymer.

TABLE 2

| Polymer | $M_n$ a) | | | | % high M. Wt. arms | wt % styrene | wt % diblock |
|---|---|---|---|---|---|---|---|
| | $S_1$ | $S_2$ | arm | star | | | |
| A | 4,000 | 26,000 | 173,000 | 1,270,000 | 20 | 6 | 6 |
| B | 3,000 | 15,000 | 135,000 | 1,136,000 | 40 | 6 | 3 |
| C | 2,000 | 9,000 | 96,000 | [775,000]<br>775,000 | 60 | 8 | 4 |
| D | 4,000 | — | 175,000 | [1,136,000]<br>1,166,000 | 0 | 3 | 5 |
| E | — | 13,000 | 140,000 | 1,109,000 | 100 | 10 | 5 | a) Measured by SEC using polystyrene standards

EXAMPLE 2

Each of the block copolymers of Example 1 was combined with Wingtack ™ Plus tackifier resin, and Zonarez ™ A-25 plasticizer in the amounts given in Table 3. The amounts are given as parts by weight per 100 parts block copolymer. Wingtack ™ Plus (available from Goodyear Tire & Rubber Co., Akron, Ohio) is an aromatically modified petroleum hydrocarbon resin having a softening point (ring & ball) of 93°–100° C., a specific gravity of 0.93 at 25° C., and a molecular weight of 1100. Zonarez ™ A-25 (available form Arizona Chemical Co.) is a poly alpha-pinene resin having a softening point (ring and ball) of 25° C.

The resulting compositions were weighed dry and dissolved in toluene to give a 35% solids by weight solution. The solutions were separately knife coated onto 38.1 micrometer (1.5 mil) thick biaxially oriented polyethylene terephthalate (PET) film at a coating weight of 41.94 g/m² (10 grains/24 in²). The coatings were dried for three minutes at room temperature (22° C. or 72° F.) followed by 2 minutes at 180° F. (82° C.) in a convection oven and removed from the oven and covered with a silicone coated release liner. Two samples of each formulation were made, and one sample of each was irradiated with electron beam radiation using an Electrocurtain CB-300 electron beam system (available from Energy Sciences, Inc., Wilmington, Mass.). Before irradiation, the liner was removed, and the adhesive was irradiated at 150 kV at a dose of 5 MRads. The liner was then replaced. The adhesion and low stress peel properties of each adhesive formulation were then measured. These measurements were conducted in a controlled environment testing room maintained at 70° F. (21° C.) and 50% relative humidity.

To measure adhesion, the tapes were conditioned in the controlled environment for 24 hours and analyzed on a Sintech 6 computerized system for material testing, according to standard tape method PSTC-1, Peel Adhesion for Single Coated Tapes 180° Angle. The tape was removed at an angle of 180 degrees at a rate of 30.5 cm/min (12 in/min). A load cell linked to a computer was used to estimate the value reported for adhesion. The adhesion values are reported in Table 3 under the ADH columns.

To measure low stress peel, the tapes were again conditioned for 24 hours in a controlled environment. Samples of each tape measuring 4 inches (101.6 mm) by 0.75 inches (19.05 mm) were applied to a diacetone alcohol-washed 4 inch long (101.6 mm) brightly annealed, highly polished 304 stainless steel test panel, and rolled down with four passes of a 2 kg (4.5 lb) rubber-faced roller. A static load of 200 grams was attached to the tape at an angle of 90 degrees, and the time it took for the load to drop was measured in minutes. The test results, reported under the LSP column in Table 3, represent the average of two duplicate tests.

The mode of failure in the low stress peel test is also indicated in Table 3 for each tape. COH indicates cohesive failure, meaning visible adhesive residue was left on the test panel when the adhesive separated from the test panel. ADH indicates an adhesive failure wherein the adhesive leaves no residue on the test panel.

TABLE 3

| Adhesive Formulation | | | | | | | |
|---|---|---|---|---|---|---|---|
| Polymer | Tackifier (phr) | Plasticizer (phr) | Dose (Mrads) | ADH (oz/in) | ADH (N/m) | LSP (min) | fail mode |
| A | 40 | 30 | 0 | 44.8 | 490 | 193 | ADH |
| B | 40 | 30 | 0 | 54.4 | 595 | 399 | ADH |
| C | 40 | 30 | 0 | 54.4 | 595 | 546 | ADH |
| D | 40 | 30 | 0 | 43.2* | 472* | 3.2 | COH |
| E | 40 | 30 | 0 | 44.8 | 490 | 18 | ADH |
| A | 40 | 30 | 5 | 25.6 | 280 | 4000[a] | ADH |
| B | 40 | 30 | 5 | 35.2 | 385 | 6000[a] | ADH |
| C | 40 | 30 | 5 | 30.4 | 332 | 5000[a] | ADH |
| D | 40 | 30 | 5 | 70.4 | 770 | 10000[a] | COH |
| E | 40 | 30 | 5 | 28.8 | 315 | 10 | ADH |

[a] values were extrapolated after about 1500 minutes.
*This sample showed cohesive failure (COH) in the adhesion test as well as the low stress peel test.

From this data, it is apparent that an adhesive made from a branched block copolymer having only one distribution of polystyrene endblock molecular weights does not provide the desired balance of adhesive properties needed for many applications.

The tape made from an adhesive comprising a non-crosslinked block copolymer having only low molecular weight styrene endblocks shows insufficient resistance to low stress peel (3.2 minutes) and fails in the cohesive mode, leaving adhesive residue on the substrate upon separation (see data in row 4). The tape made from an adhesive comprising a non-crosslinked block copolymer having only high molecular weight styrene endblocks shows insufficient resistance to low stress peel (18 minutes, see data in row 5).

The tape made from an adhesive containing a crosslinked block copolymer having only low molecular weight styrene endblocks shows good resistance to low stress peel (10,000 minutes), but the adhesive fails in a cohesive mode, leaving visible residue on the substrate upon separation (see data in row 9). The tape made from an adhesive containing a crosslinked block copolymer having only high molecular weight styrene endblocks has unsatisfactory resistance to low stress peel (10 minutes, see data in row 10).

Tapes made from adhesives of the present invention, containing block copolymers having both low and high molecular weight polystyrene endblocks on the same molecule, (1) maintain moderate adhesion, thereby being easy to remove; (2) have good resistance to low stress peel, so that they resist lifting under light loads; and (3) remove cleanly from a substrate without leaving adhesive residue (see data in rows 1-3 and 6-9). In addition, crosslinking the adhesive will improve its cohesive strength and high temperature and solvent resistance. This adhesive is especially useful for making removable tapes, such as masking tapes, but may be useful in other applications. Such applications include packaging tapes, medical tapes, autoclave indicator tapes, protective sheeting, labels, and facestock. In addition, the adhesive may be used to provide a tape that withstands a variety of temperatures and chemical environments.

What is claimed is:

1. A pressure sensitive adhesive composition comprising:
    (a) 100 parts by weight of a polymodal asymmetric elastomeric block copolymer;
    (b) about 25 to 400 parts by weight of a tackifying resin;
    (c) 0 to about 50 parts by weight of a crosslinking agent; and
    (d) 0 to about 200 parts by weight of a plasticizer;
wherein said polymodal asymmetric elastomeric block copolymer has the formula $O_nY$ and comprises from about 4 to about 40 percent by weight of a polymerized monovinyl aromatic compound and from about 96 to about 60 percent by weight of polymerized conjugated diene, wherein:
    O represents an individual arm of the block copolymer and has the formula S-B;
    n represents the number of arms O in the block copolymer and is a whole number of at least 3; and
    Y is the residue of a multifunctional coupling agent; and further wherein:
    (a) S is a nonelastomeric polymer segment endblock of a polymerized monovinyl aromatic homopolymer, there being at least two different molecular weight endblocks in the copolymer, a higher molecular weight endblock and a lower molecular weight endblock, wherein:
        (i) the number average molecular weight of the higher molecular weight endblock $(Mn)_H$ is in the range of from about 5,000 to about 50,000;
        (ii) the number average molecular weight of the lower molecular weight endblock $(Mn)_L$ is in the range of from about 1,000 to about 10,000; and
        (iii) the ratio $(Mn)_H/(Mn)_L$ is at least 1.25; and
    (b) B is an elastomeric polymer segment midblock which connects each arm to the residue of a multifunctional coupling agent (Y) and comprises a polymerized conjugated diene or combination of conjugated dienes.

2. A pressure sensitive adhesive composition according to claim 1 wherein the tackifying resin is compatible with the elastomeric polymer segment midblock.

3. A pressure sensitive adhesive composition according to claim 2 wherein the tackifying resin is further compatible with at least one nonelastomeric polymer segment endblock.

4. A pressure sensitive adhesive composition according to claim 1 wherein the polymodal asymmetric elastomeric block copolymer is crosslinked.

5. A pressure sensitive adhesive composition according to claim 4 wherein radiation is used to effectuate said crosslinking.

6. A pressure sensitive adhesive composition according to claim 5 wherein said radiation is selected from the group consisting of electron beam and ultraviolet radiation.

7. A film of a pressure sensitive adhesive composition according to claim 1.

8. A backing having first and second major surfaces and a pressure sensitive adhesive composition according to claim 1 coated on at least a portion of the first major surface.

9. A tape comprising a backing having first and second major surfaces and pressure sensitive adhesive composition according to claim 1 coated on at least a portion of the first major surface.

10. A tape according to claim 9 wherein the polymodal asymmetric elastomeric block copolymer is crosslinked.

11. A tape according to claim 10 wherein the pressure sensitive adhesive composition possesses a polymer gel content of at least about 60 percent.

12. A tape according to claim 9 wherein the backing is paper.

13. A tape according to claim 12 wherein the adhesive is crosslinked.

14. A tape according to claim 9 wherein the backing is a polymer.

15. A tape according to claim 14 wherein the backing is polyethylene terephthalate.

16. A tape according to claim 15 wherein the adhesive is crosslinked.

17. A tape according to claim 9 wherein the backing further comprises a release surface.

18. A tape according to claim 9 wherein the pressure sensitive adhesive composition is further provided on a second major surface of the backing.

19. A pressure sensitive adhesive composition according to claim 1 wherein said polymodal asymmetric elastomeric block copolymer comprises from about 5 to about 25 percent by weight of a polymerized monovinyl aromatic compound.

20. A pressure sensitive adhesive composition according to claim 1 wherein said polymerized monovinyl aromatic compound is polystyrene, said polymerized conjugated diene is polyisoprene, and said multifunctional coupling agent is divinylbenzene.

21. A pressure sensitive adhesive composition according to claim 1 wherein $(Mn)_H$ is between about 10,000 and about 35,000, and $(Mn)_L$ is between about 2,000 and 9,000.

22. A pressure sensitive adhesive composition according to claim 1 wherein the number of arms containing higher molecular weight endblocks is between about 5 and 65 percent of the total arms, when there are two endblock molecular weights.

23. A pressure sensitive adhesive composition according to claim 1 wherein said tackifying resin is selected from the group consisting of hydrocarbon resins, hydrogenated resins and aromatic modified hydrocarbons.

24. A pressure sensitive adhesive composition according to claim 11 wherein said plasticizer comprises a liquid hydrocarbon resin.

25. A pressure sensitive adhesive composition according to claim 1 comprising 50 to 125 parts by weight of a tackifying resin; 0 to 10 parts by weight of a crosslinking agent; and 0 to 100 parts by weight of a plasticizer.

* * * * *

UNITED STATES PATENT AND TRADEMARK OFFICE
CERTIFICATE OF CORRECTION

PATENT NO. : 5,393,787
DATED : February 28, 1995
INVENTOR(S) : Nestagard et al.

It is certified that error appears in the above-indentified patent and that said Letters Patent is hereby corrected as shown below:

Col. 1, line 23  "[11977]" should be --[1977]--

Col. 7, line 50

"Table 2.

| Polymer | $M_n$a) | | | | % high M. Wt. arms | wt% styrene | wt% diblock |
|---|---|---|---|---|---|---|---|
| | $S_1$ | $S_2$ | arm | star | | | |
| A | 4,000 | 26,000 | 173,000 | 1,270,000 | 20 | 6 | 6 |
| B | 3,000 | 15,000 | 135,000 | 1,136,000 [775,000] | 40 | 6 | 3 |
| C | 2,000 | 9,000 | 96,000 | 775,000 [1,136,000] | 60 | 8 | 4 |
| D | 4,000 | - | 175,000 | 1,166,000 | 0 | 3 | 5 |
| E | - | 13,000 | 140,000 | 1,109,000 | 100 | 10 | 5 | a) Measured by SEC using polystyrene standards"

should be

--Table 2.

| Polymer | $M_n$a) | | | | % high M. Wt. arms | wt% styrene | wt% diblock |
|---|---|---|---|---|---|---|---|
| | $S_1$ | $S_2$ | arm | star | | | |
| A | 4,000 | 26,000 | 173,000 | 1,270,000 | 20 | 6 | 6 |
| B | 3,000 | 15,000 | 135,000 | 1,136,000 | 40 | 6 | 3 |
| C | 2,000 | 9,000 | 96,000 | 775,000 | 60 | 8 | 4 |
| D | 4,000 | - | 175,000 | 1,166,000 | 0 | 3 | 5 |
| E | - | 13,000 | 140,000 | 1,109,000 | 100 | 10 | 5 | a) Measured by SEC using polystyrene standards--

UNITED STATES PATENT AND TRADEMARK OFFICE
CERTIFICATE OF CORRECTION

PATENT NO. : 5,393,787
DATED : February 28, 1995
INVENTOR(S) : Nestagard et al.

It is certified that error appears in the above-indentified patent and that said Letters Patent is hereby corrected as shown below:

Col. 10, line 23      "$O_nY$" should be --$Q_nY$--

Col. 10, lines 28 and 30      "O" should be --Q--

Signed and Sealed this

Nineteenth Day of March, 1996

Attest:

BRUCE LEHMAN

*Attesting Officer*      *Commissioner of Patents and Trademarks*